United States Patent
Oh

(10) Patent No.: US 7,356,359 B2
(45) Date of Patent: Apr. 8, 2008

(54) DEVICE DETECTION IN A MOBILE COMMUNICATION TERMINAL

(75) Inventor: Hyung-Suk Oh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 11/208,267

(22) Filed: Aug. 18, 2005

(65) Prior Publication Data

US 2006/0046788 A1    Mar. 2, 2006

(30) Foreign Application Priority Data

Aug. 24, 2004    (KR) .................. 10-2004-0066875

(51) Int. Cl.
H04M 1/00    (2006.01)
(52) U.S. Cl. ............. 455/569.1; 455/418; 455/419; 455/420; 455/41.2; 455/556.1; 455/556.2; 455/557; 455/559; 455/569.2; 710/264; 710/301; 710/302
(58) Field of Classification Search ........... 455/418, 455/419, 420, 41.2, 556.1, 556.2, 557, 569.1, 455/559, 569.2; 710/264, 301, 302; 307/125; 702/63
See application file for complete search history.

(56) References Cited

U.S. PATENT DOCUMENTS

| 5,708,799 A | * | 1/1998 | Gafken et al. ............. 710/301 |
| 6,088,602 A | * | 7/2000 | Banister ..................... 455/574 |
| 6,430,517 B1 | * | 8/2002 | Williams ..................... 702/63 |
| 6,502,152 B1 | * | 12/2002 | Laurenti ..................... 710/264 |
| 6,509,659 B1 | * | 1/2003 | Carroll et al. ............. 307/125 |
| 6,725,061 B1 | | 4/2004 | Hutchison, IV et al. |
| 2003/0172217 A1 | * | 9/2003 | Scott et al. ................ 710/303 |

FOREIGN PATENT DOCUMENTS

| CN | 1520215 | | 8/2004 |
| GB | 2 389 429 A | | 12/2003 |
| GB | 2389429 | * | 12/2003 |
| KR | 10 2000 0018486 A | | 4/2000 |
| KR | 10 2002 0055855 A | | 7/2002 |

* cited by examiner

Primary Examiner—Steve M. D'Agosta
(74) Attorney, Agent, or Firm—Lee, Hong, Degerman, Kang & Schmadeka

(57) ABSTRACT

A method for determining connection of an external device to a mobile communication terminal is provided. The method comprises detecting connection of an external device to a mobile communication terminal based on a signal generated by a first operation module of the mobile communication terminal; activating a connection interrupt routine, in response to the signal generated by the first operation module; controlling an active status of a second operation module by way of the first operation module to switch system operations from a first clock speed to a second clock speed; and establishing a signal transfer path between the mobile communication terminal and the external device.

13 Claims, 2 Drawing Sheets

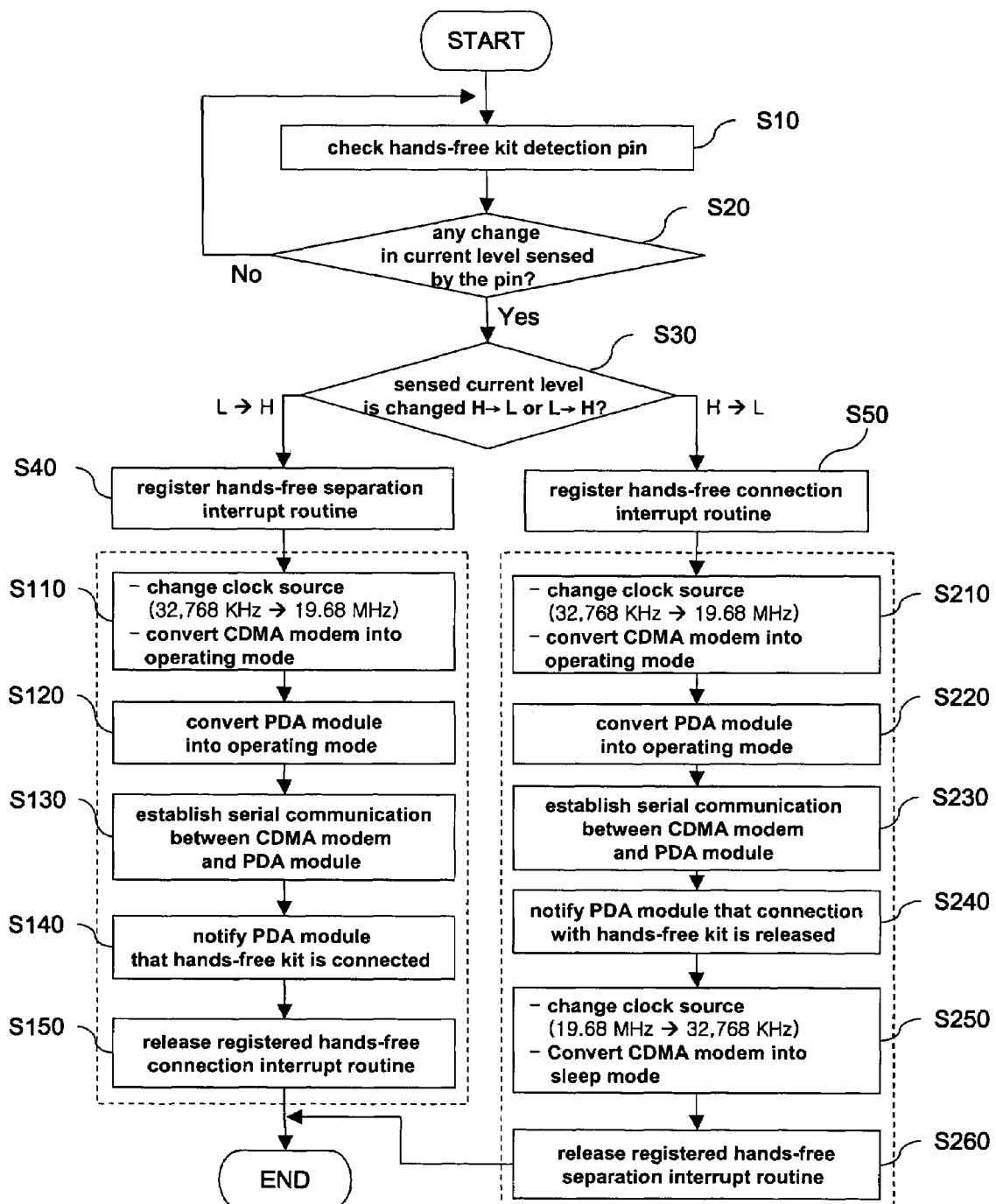

DEVICE DETECTION IN A MOBILE COMMUNICATION TERMINAL

CROSS-REFERENCE TO RELATED APPLICATIONS

Pursuant to 35 U.S.C. § 119(a), this application claims the benefit of earlier filing date and right of priority to Korean Patent Application No. 2004-0066875, filed on Aug. 24, 2004, the content of which is hereby incorporated by reference herein in its entirety.

FIELD OF THE INVENTION

The present invention relates to a mobile communication terminal, and particularly to a method and system for detecting connection of an external device to a Personal Digital Assistant (PDA) type mobile communication terminal.

BACKGROUND OF THE INVENTION

A Personal Digital Assistants (PDA) is a type of portable computer. The PDA refers to a portable information terminal capable of storing documents created using a computer. A PDA may be used for activities such as calculating, managing schedules, and the like. As information technology develops at a rapid pace, PDAs are increasingly popular among professionals that use the PDA's convenient features to manage information.

The PDA can process information which a user directly composes by hand as well as information downloaded from a computer, and provide to the user various information services such as on-line stock exchange, electronic commerce, and the like through a radio (wireless) communication.

A PDA type mobile communication terminal (e.g., a PDA phone) in which special functions are combined with a mobile communication terminal operates using an operating system similar to personal computers. As a result, a PDA phone is compatible with normal computers and can provide to users various services, such as traffic information as well as functions for wireless conversations and facsimile communication.

A hands-free device can be configured to connect to a PDA phone to allow the user communicate even when the phone is not held next to the user's ear. When a connector of a hands-free kit is connected or disconnected from a PDA phone, the PDA phone detects the connection state to establish an audio path. In ordinary electronic and electric equipment, the PDA phone uses an interrupt method or a polling method for detecting the connection state.

In the interrupt method, a processor receives a report for an interrupt generation while performing another operation. The processor stops its operation and activates a designated routine to accommodate the connection of the hands-free kit. Also, in the polling method, the processor periodically performs a separate scanning operation for detecting a new hardware, and when a new hardware is detected, the processor performs the designated routine.

A PDA phone according to the related art uses the polling method for polling a hands-free detection pin and an outer power detecting pin by a time period of 100 ms. Problems caused by using the related art PDA phone adapting the polling method will now be explained.

In general, portable terminals such as PDA phones or mobile communication terminals receive clocks from different clock sources depending on whether the mobile station modem is in a sleep state (i.e., sleep mode) or in a wake-up state (i.e., operating mode).

When the mobile station modem is in the sleep mode, the PDA phone receives a clock signal from a sleep crystal (32.768 KHz). Instead, when in the operating mode, the PDA phone receives the clock signal from a Temperature Compensated X-tal Oscillator (TCXO) crystal (19.68 MHz).

As a result of this dual synchronization mode, when the mobile station modem is in the sleep mode, the timing for detecting the hands-free kit is lengthened, due to a lower clock speed in comparison with a state when the mobile station modem is in the operating mode.

Moreover, when the related art PDA phone uses the polling method, if the hands-free kit is connected or disconnected very quickly, the related art mobile station modem in the sleep mode cannot sense the change of the state of the hands-free kit. This may result in an error in establishment of an audio path for the PDA phone.

A solution to the above problems is needed.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for determining connection of an external device to a mobile communication terminal is provided. The method comprises detecting connection of an external device to a mobile communication terminal based on a signal generated by a first operation module of the mobile communication terminal; activating a connection interrupt routine, in response to the signal generated by the first operation module; controlling an active status of a second operation module by way of the first operation module to switch system operations from a first clock speed to a second clock speed; and establishing a signal transfer path between the mobile communication terminal and the external device.

In one embodiment, the signal transfer path is for communication of an audio signal. The step of establishing the signal transfer path comprises registering a separation interrupt routine in preparation for disconnection of the external device. The step of registering the separation interrupt routine comprises releasing a connection interrupt registered in an interrupt vector table. The signal transfer path is restored by registering the connection interrupt routine in preparation for establishing a signal transfer path with the external device.

In a preferred embodiment, the step of registering the connection interrupt routine comprises releasing a separation interrupt registered at an interrupt vector table. The connection interrupt routine comprises switching the first operation module into the operating mode; applying an activation signal to the second operation module by the first operation module to switch the second operation module into an operating mode; initializing a first serial communication port of the first operation module; initializing a second serial communication port of the second operation module; notifying the second operation module that the external device is connected through the first and second serial communication ports; and establishing the signal transfer path for the connected external device by the second operation module after receiving the notification.

The switching the first operation module into the operating mode comprises changing speed of clock signal provided to the first operation module. A separation interrupt routine is activated, wherein the separation interrupt routine comprises switching the first operation module into an operating mode; applying an activation signal to the second operation module by the first operation module to switch the second operation module into the operating mode; initializing a first serial communication port of the first operation module; initializing a second serial communication port of the second operation module; notifying the second operation module that the connection with the external device is released through first and second serial communication ports; restoring the signal transfer path; and switching the first operation module into a sleep mode.

In accordance with one aspect of the system, the switching step comprises changing speed of a clock signal supplied to the first operation module. The clock signal is switched to at least one of an operation mode and a sleep mode. The first operation module is a Code Division Multiple Access (CDMA) modem. The external device is a hands-free communication kit. The second operation module is a Personal Digital Assistants (PDA) module.

In yet another preferred embodiment, the external device sensing system in a mobile communication terminal comprises a sensor for detecting a connection between an external device and the mobile communication terminal; a switch for switching a modem of the mobile communication terminal into an operating mode by way of a connection interrupt routine; a switch for switching a PDA module of a mobile communication terminal into the operating mode; and a communication port for establishing a communication connection between the PDA module and the modem, wherein the PDA module is notified through the communication port that a connection with the external device is established, the external device establishes a signal transfer path with the PDA module after receiving the notification, and wherein a connection interrupt is registered at an interrupt vector table of the mobile communication terminal to indicate the establishment of a signal transfer path between the external device and the PDA module.

Speed of a clock signal supplied to the modem is changed when the modem switches into the operating mode. A separation interrupt routine is registered in preparation for disconnection of the mobile communication terminal with the external device. The signal transfer path is associated with an audio signal. The external device is a hands-free kit. The mobile communication terminal is a Personal Digital Assistants (PDA) type mobile communication terminal.

In accordance with yet another embodiment, the external device sensing method in a mobile communication terminal comprising detecting that a connection with an external device is released; switching a modem of the mobile communication terminal into an operating mode by way of activating a separation interrupt routine; switching a PDA module of the mobile communication terminal into the operating mode by way of activating the mobile station module; establishing communication between the modem and the PDA module; notifying the PDA module that the connection with the external device is released; restoring a signal transfer path after notifying the PDA module that the external device is released; converting the modem into a sleep mode; and releasing a separation interrupt register of the mobile communication terminal.

The switching step comprises changing speed of a clock signal supplied to the modem and the releasing step comprises registering a connection interrupt routine in preparation of the release of the external device from the mobile communication terminal.

In yet another embodiment, an external device sensing method in a mobile communication terminal having a plurality of operating systems is provided. The method comprises determining whether a first operating system is communicating with an external device; notifying a second operating system of the communication between the first operating system and the external device; and establishing a signal transfer path between the external device and the second operating system.

The method further comprises changing at least one of a first mode and a first clock speed, when a connection is established between the external device and the mobile communication terminal, monitoring disconnection of the external device from the mobile communication terminal based on a change in the first clock speed, and changing at least one of a second mode and a second clock speed when the external device is disconnected from the mobile communication terminal.

In one embodiment, the connection with the external device is monitored according to the second reference clock. The first operating system is a communication module and the second operating system is a Personal Digital Assistants (PDA) module.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a flowchart showing a method for series detecting a hands-free kit according to one embodiment of the present invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
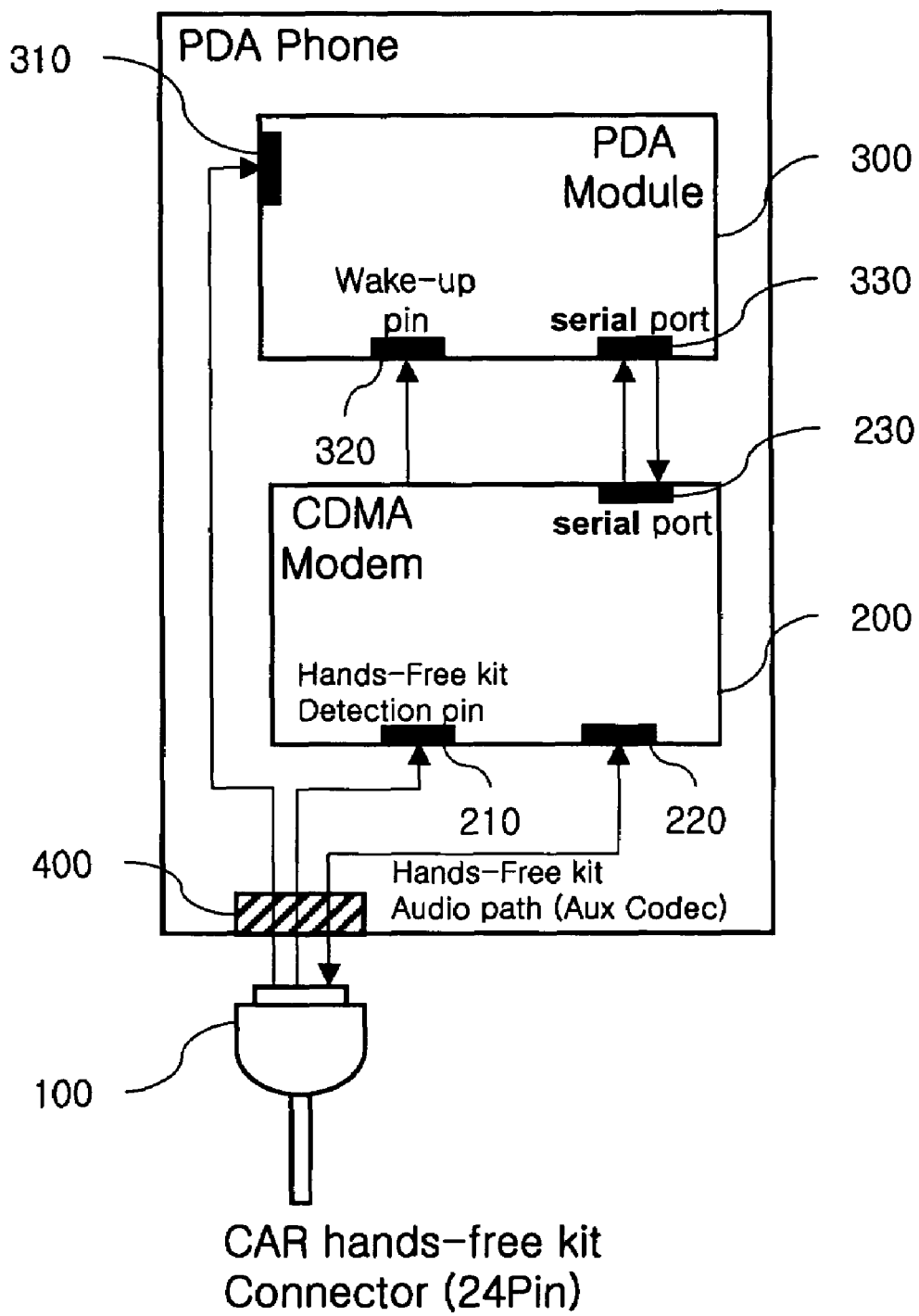
FIG. 1 is a block diagram showing a construction of a PDA phone according to one embodiment of the present invention.

In accordance with one aspect of the invention, a PDA phone comprises a mobile station modem for managing transmission/reception of a mobile communication signal, and a PDA module for controlling PDA functions and services.

FIG. 1 shows a construction of a PDA phone according to an embodiment of the present invention, in which a PDA phone adapting a Code Division Multiple Access (CDMA) method is illustrated.

As shown, a mobile station modem 200, according to an embodiment of the present invention, comprises a hands-free kit detection pin 210 for detecting a hands-free kit; an audio pin 220 for managing transfer of an audio signal between the hands-free kit and the PDA phone; and a first serial communication port 230 for transmitting (or receiving) control command, status information, or the like to/from a PDA module 300.

In accordance with an exemplary embodiment, the PDA module 300 comprises a wake-up pin 320 for receiving a wake-up signal of the CDMA modem 200; and a second serial communication port 330 for receiving (or transmitting) the control command, status information, or the like from/to the CDMA modem 200.

FIG. 2 is a flowchart showing sequential steps of a hands-free kit detecting method according to one embodiment of the present invention.

In the following a CDMA modem 200 is provided according to an exemplary embodiment of the invention for polling the hands-free kit detection pin 210 during a first interval (i.e., 50 ms), and checking a current level applied to the hands-free kit detection pin 210.

If the current level applied to the hands-free kit detection pin 210 is more than a first logic level or value (e.g., a 'high state'), then it is determined that the hands-free kit is connected to the PDA phone. Conversely, if the current level is less than the first logic level or value (e.g., a 'low state'), it denotes a state that indicates that the hands-free kit is separated from the PDA phone.

When the current level of the hands-free kit detection pin 210 changes from a low state to a high state, the CDMA modem 200 registers a connection interrupt routine (e.g., a callback function) at an interrupt vector table. When the hands-free kit is released from the connector 400, a disconnection interrupt is established in the hands-free kit detection pin 210.

In another embodiment, when the current level of the hands-free kit detection pin 210 changes from the high state into the low state, the CDMA modem 200 registers a separation interrupt routine at the interrupt vector table. When the hands-free kit is inserted into the connector 400, a connection interrupt is established in the hands-free kit detection pin 210.

Referring to FIG. 2, when a user connects the pin connector 100 of the hands-free kit to the connector 400 of the PDA phone, the hands-free kit detection pin 210 is switched into a high state. The CDMA modem 200 which has sensed the transition into the high state registers the separation interrupt routine at the interrupt vector table in preparation for the time when the connection with the hands-free kit is released (S10 to S40). The PDA phone then controls the PDA module 300 according to the connection interrupt routine previously registered (S110 to S150).

The connection interrupt routine (S110 to S150) will now be explained in more detail, in accordance with one aspect of the system.

When the hands-free kit detection pin 210 is high, the CDMA modem 200 switches into an operating mode (i.e., a wake-up state) according to the connection interrupt routine. The CDMA modem 200 changes a clock source supplied to the CDMA modem 200 to a Temperature Compensated X-tal Oscillator (TCXO) crystal (19.68 MHz), for example, in the operating mode (S110).

When the CDMA modem 200 switches to the operating mode (i.e., the wake-up state), the clock source adapted to a sleep mode is changed into that adapted to the operating mode. As a result, the CDMA modem 200 can process a command at a higher speed, and required services can be performed faster.

In a preferred embodiment, the CDMA modem 200 in the operating mode communicates with the PDA module 300, through a serial communication (e.g., Universal Asynchronous Receiver Transmitter (UART)). Accordingly, different audio paths are established, respectively, for different modes (e.g., silence mode, ear-jack mode, hands-free mode, etc).

The PDA module 300 in an operating state communicated with the CDMA modem 200 over a serial communication ports 330 and 230, respectively. The CDMA modem 200 applies a high level current to a wake-up pin 320 and converts the sleep mode of the PDA module 300 into the operating mode (S120). When the PDA module 300 is switched to the operating mode, the serial communication port 330 of the PDA module 300 is activated.

The CDMA modem 200 initializes serial communication port 230 to establish a serial communication connection with serial port 330 of the PDA module 300 (S130). The CDMA modem 200 notifies the PDA module 300 by way of the established serial communication that the hands-free kit is connected to the PDA phone (S140). The PDA module 300 having received the notification from the CDMA modem 200 establishes an audio path for a microphone and a speaker for the hands-free kit to operate.

Once the above processes are successfully performed, the CDMA modem 200 releases the connection interrupt routine (e.g., registered at the vector table) and prepares for releasing the connection with the hands-free kit, when the hands-free kit is disconnected.

When the pin connector 100 of the hands-free kit is disconnected from the connector 400 of the PDA phone, the hands-free kit detection pin 210 is switched into a low state, for example. The CDMA modem 200 senses the low state and registers the connection interrupt routine at the interrupt vector table in preparation for the hands-free kit 100 being re-connected (S50). The PDA phone then controls the PDA module 300 according to the separation interrupt routine previously registered (S210 to S260).

The separation interrupt routine will now be explained in more detail, in accordance with one aspect of the system.

When the hands-free kit detection pin 210 switches into a low state, the CDMA modem 200 is converted to the operating mode (i.e., the wake-up state). The CDMA modem 200 changes the clock source supplied to the CDMA modem 200 into the TCXO crystal (19.68 MHz), for example, applicable to the operating mode (S210).

The CDMA modem 200 converted into the operating mode applies a high level current to the wake-up pin 320. Accordingly, the PDA module 300 is converted into the operating mode and the serial communication port 330 is activated (S220 and S230). The CDMA module 200 initializes its serial communication port 230 so as to notify the PDA module 300 that the hands-free kit is connected to the PDA phone (S240). The PDA module 300 having received the notification from the CDMA modem 200 restores the audio path having established the hands-free kit to the original communication mode.

In certain embodiments, the CDMA modem 200 releases the separation interrupt registered at the interrupt vector table, and converts the state of the CDMA modem 200 into the sleep mode. As the CDMA modem 200 is converted into the sleep mode, the clock source supplied to the CDMA modem 200 is also changed into a sleep crystal (32.768 KHz), for example, applicable to the sleep mode.

In the present invention, since the connection (or separation) between the PDA phone and the hands-free kit is determined by combining an interrupt method and a polling method, the CDMA modem can sense the hands-free kit faster and more precisely. In addition, since the change of the state of the hands-free kit detection pin detected by the CDMA modem is provided to the PDA module, the related art problem in which the audio path of the PDA phone is incorrectly established can be solved.

The present invention may be embodied in several forms without departing from the spirit or essential characteristics thereof. It should also be understood that the above-described embodiments are not limited by any of the details of the foregoing description, unless otherwise specified, but rather should be construed broadly within its spirit and scope as defined in the appended claims.

For example, one or more embodiments of the system are described, by way of example, as applicable to a CDMA modem or a serial communication interface. In other embodiments, the methods and systems provided herein may be applicable to other communication devices, interfaces, or modems, operating based on other communication protocols. Therefore all changes and modifications that fall within the metes and bounds of the claims, or equivalence of such metes and bounds are therefore intended to be embraced by the appended claims.

It is evident that other alternatives, modifications, variations and embodiments may be apparent to those skilled in the art in light of the foregoing description. For example, while processors, controllers and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors).

The invention is not limited to the exemplary embodiments, but has applicability to any wireless data system. Thus, it should be understood that the invention is not limited by the foregoing descriptions of the preferred embodiments, but embraces all alternatives, modifications, and variations in accordance with the spirit and scope of the appended claims and their full scope of equivalents.

What is claimed is:

1. A method for determining connection of an external device to a mobile communication terminal, the method comprising:
    detecting connection of an external device to a mobile communication terminal based on a signal generated by a first operation module of the mobile communication terminal;
    activating a connection interrupt routine, in response to the signal generated by the first operation module;
    controlling an active status of a second operation module by way of the first operation module to switch system operations from a first clock speed to a second clock speed; and
    establishing a signal transfer path between the mobile communication terminal and the external device;
    wherein the connection interrupt routine comprises:
        switching the first operation module into the operating mode;
        applying an activation signal to the second operation module by the first operation module to switch the second operation module into an operating mode;
        initializing a first serial communication port of the first operation module;
        initializing a second serial communication port of the second operation module;
        notifying the second operation module that the external device is connected through the first and second serial communication ports; and
        establishing the signal transfer path for the connected external device by the second operation module after receiving the notification.

2. The method of claim 1, wherein the signal transfer path is for communication of an audio signal.

3. The method of claim 1, wherein the step of establishing the signal transfer path comprises registering a separation interrupt routine in preparation for disconnection of the external device.

4. The method of claim 3, wherein the step of registering the separation interrupt routine comprises releasing a connection interrupt registered in an interrupt vector table.

5. The method of claim 1 further comprising:
    restoring the signal transfer path by registering the connection interrupt routine in preparation for establishing a signal transfer path with the external device.

6. The method of claim 5, wherein the step of registering the connection interrupt routine comprises releasing a separation interrupt registered at an interrupt vector table.

7. The method of claim 1, wherein the step of switching the first operation module into the operating mode comprises changing speed of clock signal provided to the first operation module.

8. The method of claim 1, further comprising activating a separation interrupt routine, wherein the separation interrupt routine comprises:
    switching the first operation module into an operating mode;
    applying an activation signal to the second operation module by the first operation module to switch the second operation module into the operating mode;
    initializing a first serial communication port of the first operation module;
    initializing a second serial communication port of the second operation module;
    notifying the second operation module that the connection with the external device is released through first and second serial communication ports;
    restoring the signal transfer path; and
    switching the first operation module into a sleep mode.

9. The method of claim 8, wherein the switching step comprises changing speed of a clock signal supplied to the first operation module.

10. The method of claim 9, wherein the clock signal is switched to at least one of an operation mode and a sleep mode.

11. The method of claim 1, wherein the first operation module is a Code Division Multiple Access (CDMA) modem.

12. The method of claim 1, wherein the external device is a hands-free communication kit.

13. The method of claim 1, wherein the second operation module is a Personal Digital Assistants (PDA) module.

* * * * *